May 21, 1935. H. J. HECK ET AL 2,001,783
FREEWHEELING TRANSMISSION AND CONTROL THEREFOR
Filed Nov. 27, 1931    3 Sheets-Sheet 2
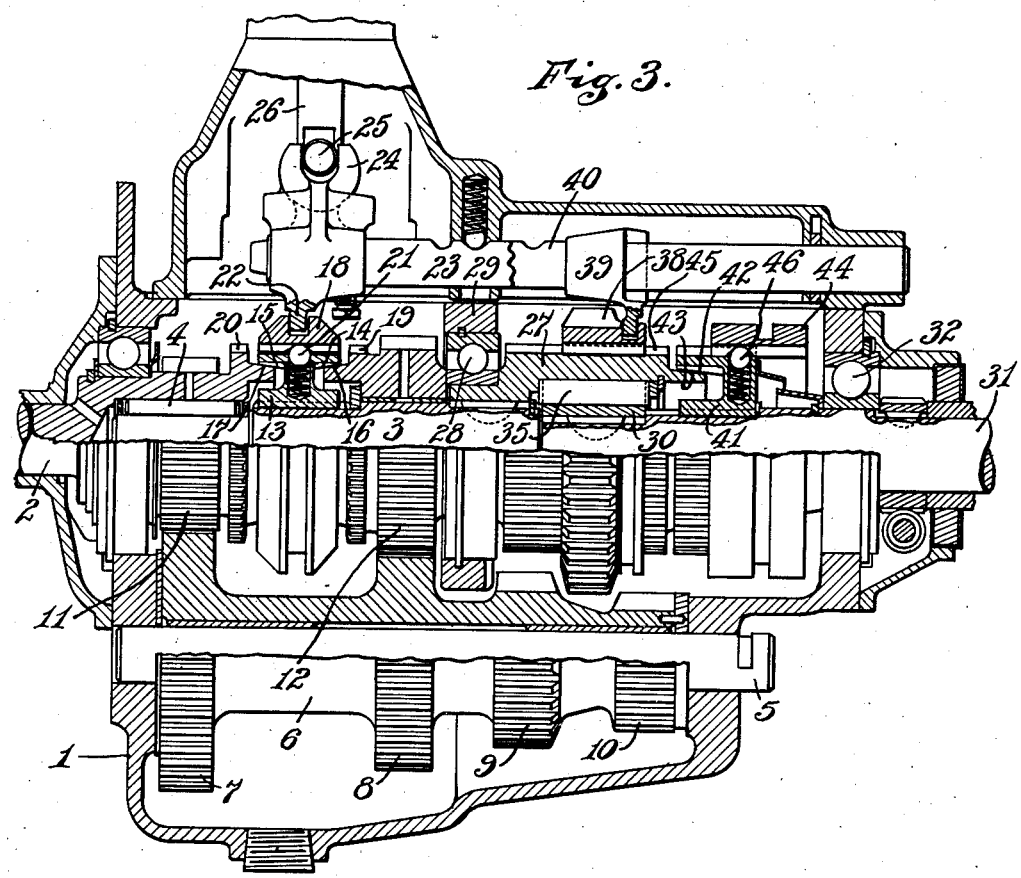
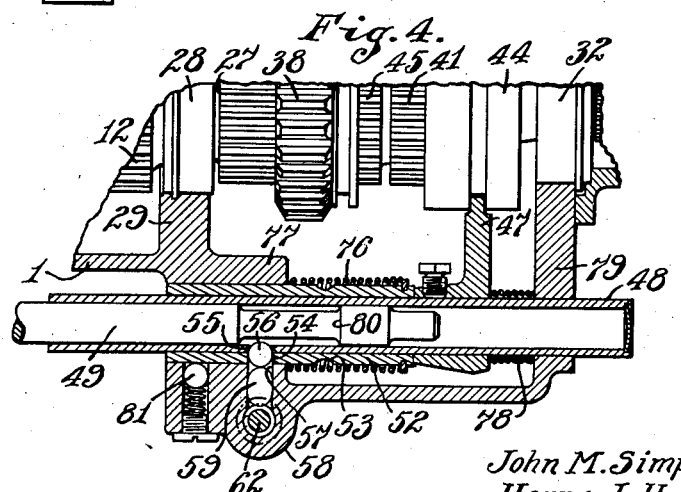
Inventors
John M. Simpson and
Harry J. Heck,
By Hood + Hahn.
Attorneys May 21, 1935.  H. J. HECK ET AL  2,001,783
FREEWHEELING TRANSMISSION AND CONTROL THEREFOR
Filed Nov. 27, 1931   3 Sheets-Sheet 3
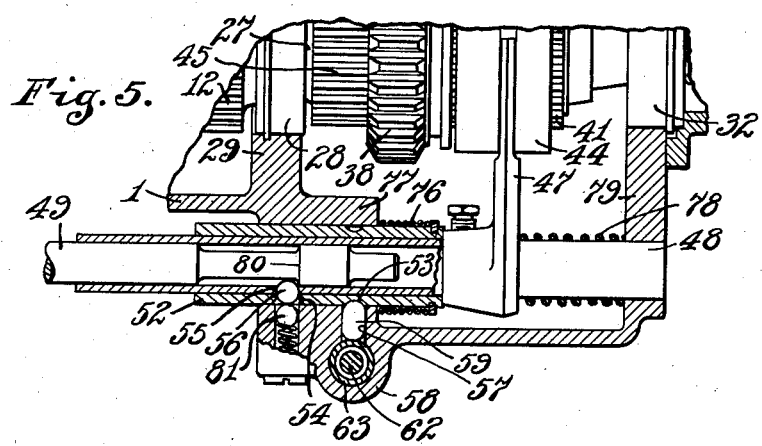
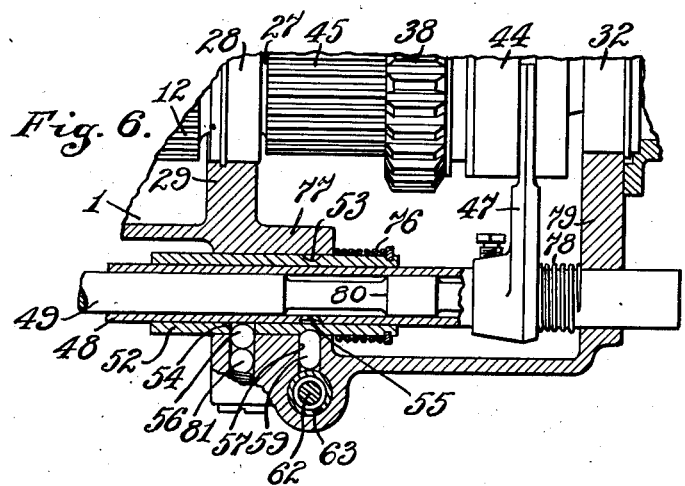
Inventors
John M. Simpson and
Harry J. Heck,
By Hood + Hahn.
Attorneys Patented May 21, 1935

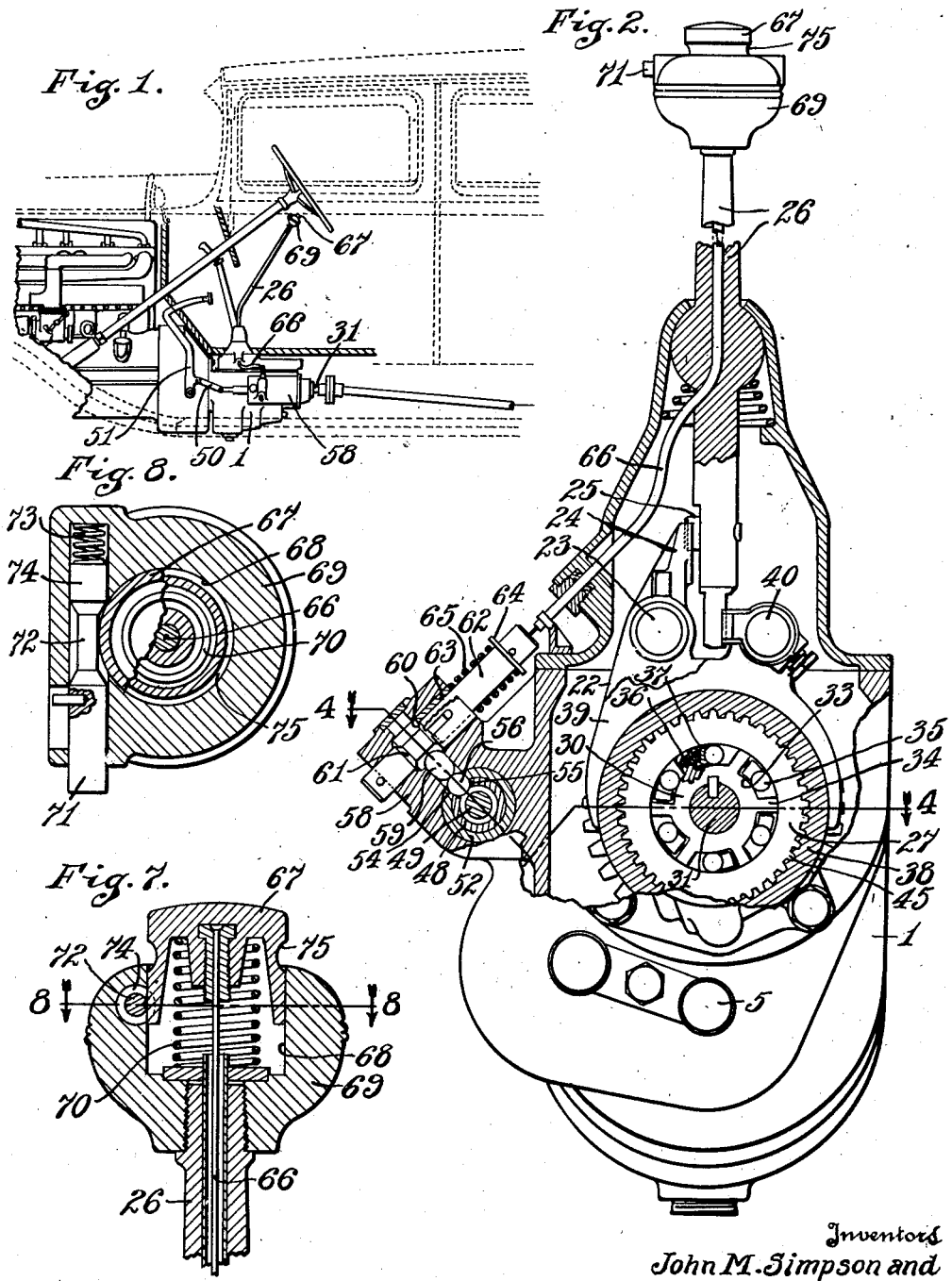

2,001,783

UNITED STATES PATENT OFFICE 2,001,783

FREE WHEELING TRANSMISSION AND CONTROL THEREFOR

Harry J. Heck and John M. Simpson, Muncie, Ind., assignors, by mesne assignments, to Free Wheeling Patents Corporation, South Bend, Ind., a corporation of Delaware Application November 27, 1931, Serial No. 577,562

19 Claims. (Cl. 192—48)

Our invention relates to improvements in transmissions and particularly to transmissions wherein there is provided free wheeling.

It is one of the objects of our invention to provide a transmission wherein the free wheeling mechanism is adapted to be interposed between all of the forward speed drives and the propeller shaft so that irrespective of the gearing connection of the forward speed drives the free wheeling or one-way clutch will be operative to disconnect the engine from the propeller shaft whenever the speed of the vehicle or the propeller shaft is greater than that of the engine shaft. It is a further object of our invention to provide means whereby the overrunning clutch may be "locked out" to permit conventional drive whenever desired by the operator and to so provide the locking out mechanism that it may readily be manipulated from the same shifter lever which is used for operating the transmission.

It is a further object of our invention to provide an easily operated lock out control which by its position will indicate to the operator whether the overrunning clutch is locked out or in overrunning operative position and which manipulating means may be operated by simple movements and preferably, by the simple pressure of a button or the like member.

It is a further object of our invention to provide a lock out mechanism and lock out manipulating mechanism which may be operated to lock out the overrunning clutch irrespective of the position of the transmission gears, that is, irrespective of whether the vehicle is being driven in high, second or low speed.

It is another object of our invention to provide a simple mechanism for automatically locking out the overrunning clutch whenever the transmission gearing is shifted for reverse drive.

A still further object of our invention is to provide means whereby the various transmission gears and particularly the lock out mechanism of the overrunning clutch may be brought into synchronization prior to the positive engagement of the clutching mechanism.

For the purpose of disclosing our invention we have illustrated certain embodiments thereof in the accompanying drawings, in which:

Fig. 1 is a side elevation of an automobile partially shown in dotted lines disclosing a transmission embodying our invention;

Fig. 2 is a rear elevation partially in section of a transmission embodying our invention;

Fig. 3 is a longitudinal sectional view of the transmission;

Fig. 4 is a detailed section taken on the line 4—4 of Fig. 2 and showing the lock out operating mechanism in position ready to move the lock out into position;

Fig. 5 is a detailed view showing the parts moved into lock out position;

Fig. 6 is a detail view showing the parts moved for reverse drive when the overrunning clutch has been locked out;

Fig. 7 is a detailed longitudinal section of the lock out control button on the shift lever, and Fig. 8 is a sectional view on the line 8—8 of Fig. 7.

In the embodiment of the invention illustrated there is provided a transmission casing 1 into which is projected a driving shaft 2 and a driven shaft 3, the two shafts being mounted in axial alignment and the driven shaft being piloted as at 4 in the driving shaft. Beneath the driving and driven shafts 2 and 3 is provided a countershaft 5 on which is mounted a spindle 6 provided with the gears 7, 8, 9 and 10, the gear 10 being adapted to mesh with a reverse idler (not shown). The gear 7 is in constant mesh with and driven from a gear 11 on the drive shaft 2 and the gear 8 is in constant mesh with and drives a gear 12 normally freely rotatably mounted on the shaft 3.

Splined on the shaft 3 is a cone friction clutch member 13 provided with opposite friction faces 14 and 15 adapted to respectively engage cone friction faces 16 and 17 on the gear 12 and the drive shaft 2. Splined on the friction clutch member is a toothed clutch member 18 adapted to engage respectively the clutch teeth 19 on the gear 12 and the clutch teeth 20 on the shaft 2. The positive clutch member 18 and the friction clutch member 17 are releasably connected by means of spring pressed balls 21 in the friction clutch member adapted to engage suitable recesses on the positive clutch member 18, so that for a portion of their movement, the two members will move together. The positive clutch member 18 is operated by a shifter fork 22 mounted on a shift rod 23 and having an upwardly extending projection 24 adapted to be engaged by a laterally extending pin 25 on the shift lever 26 when the shift lever is moved to the right looking at Fig. 2. After the lever has been moved to the right it can be moved either forward or back (or to the left or right looking at Fig. 3) for connecting the gear 12 to the shaft 3 or the shaft 3 directly to the shaft 2. The above described construction provides a synchronizing device whereby when the shift lever 26 is operated to shift the positive clutch member 18 to the right, looking at Fig. 3, the friction clutch member 14 will first be caused to engage the friction clutch member 16, thus bringing the gear 12 by means of the friction clutch into synchronized speed with the shaft 3. A continued movement of the shift lever disconnects the positive clutch member 18 from the friction clutch member 13 and permits the positive clutch member 18 to be moved independently of the friction clutch, to engage its teeth with the teeth 19 to positively connect the gear 12 with the shaft 3. For connecting the shafts directly for high speed drive the positive clutch member 18 is shifted to the left, looking at Fig. 3, whereby the same sequence of operation of the above described shift will take place. The rear end of the shaft 3 has mounted thereon the outer member 27 of an overrunning clutch. This outer member is keyed to the shaft and it and the shaft are supported in roller bearings 28 mounted in a bridge member 29 in the casing 1. The inner member 30 of the overrunning clutch is mounted on the propeller shaft 31 extending into the casing 1 and supported in ball bearings 32 in the rear wall thereof. This inner member 30 is provided with a plurality of cammed surfaces 33 between radially disposed projections 34. Rollers 35 are interposed between the cammed surfaces and the inner surface of the outer member 27 of the overrunning clutch member and these rollers are biased toward the higher portion of the surfaces by coiled springs 36 interposed between the projections 34 and shoes 37 bearing on the rollers. It will be noted that there is very little clearance, if any between the tops of the projections 34 and the inner surface of the outer overrunning clutch member 27 so that, any tendency on the part of the end of the shaft 31 to whip will be prevented and the inner end of the shaft more or less supported by the overrunning clutch. This is especially so in view of the fact that the rollers 35 are always in contact with the outer member 27. The outer member 27 on its periphery is provided with a gear 38 splined on the outer member and, therefore, axially movable thereon for movement into and out of driving engagement with the gear 9. When the gear 38 is in mesh with the gear 9 the transmission is operating in low speed. This gear 38 is shifted to its different positions by a shifter fork 39 mounted on a shift rail 40 adapted to be engaged by the lower end of the shift rod 26 when the shift rod is moved to the left looking at Fig. 2.

A friction clutch member 41 is splined on the shaft 31 and this clutch member is provided with a cone clutch surface 42 adapted when the clutch member is shifted axially to the left (looking at Fig. 3) to engage the cone friction clutch surface 43 on the outer overrunning clutch member 27. A positive or toothed clutch member 44 is splined on the friction clutch member 41 and the splined teeth of this clutch member are adapted to mesh with the splined teeth 45 on the overrunning clutch member 27. The two clutch members are releasably connected together by the spring pressed balls 46 so that for a portion of the movement of the member 44, the member 41 will move therewith. By the above construction the overrunning clutch member 27 may be positively connected to the shaft 31 whereby the overrunning clutch will be locked out. To accomplish this the member 44 is moved to the left looking at Fig. 3. This first engages the clutch surfaces 42 and 43 until the speed of the shaft 3 and the shaft 31 have reached synchronism. The continued movement of the member 44 disengages the same from the member 41 and causes the teeth thereof to mesh with the teeth 45 thereby connecting the shafts 3 and 31 by a two-way clutch.

The clutch member 44 is shifted axially back and forth by means of a shifter fork 47 mounted on a hollow shift rod 48.

This shifter rod is manipulated by means of a second shifter rod 49 connected by suitable linkage 50 with the engine clutch pedal 51, the arrangement being such that a lost motion is provided between the two rods to permit, under normal conditions, the operating of the engine clutch pedal 51 without operating the rod 48.

For operatively connecting the two rods 48 and 49 there is provided, surrounding the rod 48, a sleeve 52 having a notch 53 therein and a ball opening 54 which is adapted to coincide with an opening 55 in the rod 48. The ball 56 for connecting the rod 48 and sleeve 52 operates in a recess or channel 57 formed in an offset 58 of the casing 1. This ball is manipulated in one direction by a sliding plunger 59 also operating in the channel 57 and having rounded ends. The plunger 59 lies in the path of a pair of shoulders 60 and 61 formed on a reciprocating rod 62 guided in the casing offset 58 and reciprocating at right angles to the plunger 59. This reciprocating rod has surrounding the same an operating sleeve 63 between which and a collar 64 on the rod is arranged a coiled spring 65. The rod 62 is reciprocated by means of a Bowden wire 66 connected with the top thereof and extending upwardly and through the upper portion of the shift rod 26 to an operating button 67 arranged in a recess 68 in the knob 69 mounted on the top of the shift rod. For maintaining this button 67 normally in its raised position we interpose between the bottom of the recess 68 and the button a coiled spring 70. For maintaining the button in its depressed position we provide a transversely extending plunger 71, arranged in the knob 69 and having a channel or reduced portion 72 which accommodates the button 67 when the same is depressed. However, after the button has been depressed the coil spring 73 biases the plunger "outwardly" so that the enlarged portion 74 of the plunger 71 will take into a transverse recess 75, in the button for maintaining the button in its depressed position until the plunger 71 is moved to releasing position.

The fork 47 is biased to move the lock out clutch member 44 to non-lock out position by a coiled spring 76 interposed between a part 77 of the casing offset 58 and the fork. This spring operates against a second coiled spring 78 interposed between the fork and an opposite end 79 of the casing offset.

In operation we will assume that the parts are in the position illustrated in Fig. 3, which is free wheeling position and it is desired to lock out the free wheeling clutch. Under these circumstances the operator depresses the button 67 which is held in its depressed position by the locking plunger 71. This depression of the button 67 depresses the plunger rod 62 engaging the shoulder 60 with the plunger 59 and moving the ball 56 into the position illustrated in Fig. 4, that is in the coinciding openings 54 and 55. This movement also compresses the spring 65 to a point where, under proper conditions, the sleeve 63 will be depressed to further operate the plunger 59. It will be noted that the opening 55 in the shift rod 48 is contracted so that the ball 56 cannot move past a predetermined position. With the ball moved into the coinciding openings 54 and 55 the sleeve 52 and the shift rod 48 are locked together and the ball 56 is in position to be engaged by the shoulder 80 on the rod 49. Therefore, when the clutch pedal 51 is depressed, moving the rod 49 to the left looking at Fig. 4, the shoulder 80 will engage the ball 56 and move the sleeve 52 and with it the shift rod 48, compressing the coil spring 76. As the sleeve 52 is moved to the left, looking at Fig. 4, the notch 53 will be brought opposite the plunger 59 and the sleeve 63 having been depressed by the coil spring 65 will force the plunger into this notch 53 thereby locking the sleeve 52 against movement in either direction.

The movement of the shift rod 48 to the left moves the two-way toothed member 44 to the left, looking at Fig. 3, first moving the friction clutch members 42 and 43 into engagement and then engaging the teeth of the member 44 with the teeth 45 on the overrunning clutch member 27. This locks the overrunning clutch member 27 to the shaft 31 so that the overrunning clutch is locked out and the propeller shaft is driven by a two-way clutch.

When the plunger 59 is locking by its engagement in the notch 53, the sleeve 52 in its forward position, the clutch pedal 51 may be released without affecting further, the operation of the parts and the overrunning clutch will remain locked out. When the ball 56 has been moved by the shoulder 80 to the left looking at Fig. 4, it ultimately reaches a position illustrated in Fig. 5 wherein it comes into alignment with a spring pressed ball 81. This ball merely maintains the locking ball 56 in its locking position while at the same time permits the over movement of the rod 49, should this movement occur.

The parts are now in the position illustrated in Fig. 5 with the lock out clutch in position and it will be noted that any operation of the clutch pedal 51 will not affect the parts heretofore described. In this position the coil spring 76 is placed under tension and remains so as long as the transmission is driven with the overrunning clutch locked out. If at any time the operator desires to free wheel again all that is necessary is for him to release the button 67 by moving the plunger 71 inwardly against the tension of the coiled spring 73. This moves the reduced portion 72 to releasing position and the coiled spring 70 raises the button 67. The raising of the button 67 immediately raises the reciprocating plunger 62 releasing the tension on the spring 65 thereby permitting the sleeve 63 to raise to release the plunger 59. Releasing the plunger 59 causes the same to move out of its notch 53 thus releasing the sleeve 52, which under the influence of the coiled spring 76 will shift the fork 47 back to the right, looking at Fig. 4, thereby shifting the lock out clutch to the right, looking at Fig. 3, and releasing the overrunning clutch member 27. This movement of the sleeve 52 moves the shift rod 48, to the right, due to the fact that the ball 56 has interlocked the sleeve with the shift rod 48 and during this movement to the right of these two parts the ball 56 is carried to the right looking at Fig. 5, until it again positions opposite the plunger 59. The spring 76 being stronger than the spring 78, the spring 78 will, during the above movement, offer no great resistance to the operation of the spring 76.

When the transmission is shifted into reverse it is necessary that the free wheeling clutch be locked out. In order to shift into reverse, the gear 38, which it will be remembered is splined on the overrunning clutch member 27 is shifted to the right, looking at Fig. 3, until it meshes with a reversing idler (not shown). This shifting of the gear 38 to the right will cause it to bridge the splined teeth on the clutch member 41 and the splined teeth 45 on the overrunning clutch member 27 thereby locking out the overrunning clutch. If the member 44 is in lock out position there will be no difficulty in the shifting of the member 38 to the right as, the gear 38 will merely strike the lock out clutch member 44 moving it to the right with the gear 38. Under these circumstances, the coiled spring 78 will be compressed and will remain compressed until the gear 38 is again shifted to the left. As soon as this happens the coiled spring 78 will cause the member 44 to follow the movement of the gear 38 to the left into lock out engagement with the teeth 45. It is thus seen that when the parts are moved out of position, with the overrunning clutch locked out, for forward drive they will immediately move back to their lock out position when the transmission is shifted out of reverse. In Fig. 6 we have illustrated the position of the parts of the lock out shift mechanism when the transmission has been shifted into reverse position and it will be noted that the compression of the coiled spring 76 has not been affected by this shifting.

We claim as our invention:

1. In a transmission, the combination with a drive shaft, a clutch control means, of means for establishing a one-way drive between said drive shaft and the vehicle to be operated, means for locking out said one-way drive means to establish a two-way drive between said shaft and the vehicle, operating means for said lock out means, normally inoperative means for temporarily connecting said lock out operating means and clutch control means and means for locking said lock out operating means in lock out position.

2. In a transmission, the combination with a drive shaft and clutch control means and transmission control means, of means for establishing a one-way drive between said drive shaft and the vehicle to be driven, means for locking out said one-way drive means to establish a two-way drive between said drive shaft and the vehicle, operating means for said lock out means, means for temporarily connecting said lock out operating means and said clutch control means and means for locking said lock out operating means in its lock out position and means associated with said transmission control means for locking said connecting and operating means.

3. In a transmission, the combination with a drive shaft and clutch control means, of means for establishing a one-way drive between said drive shaft and the vehicle to be operated, means for locking out said one-way drive means to establish a two-way drive between said shaft and vehicle, operating means for said lock out means, operator control means for connecting said lock out operating means to the clutch control means during a portion of its movement in one direction and means for locking said lock out operating means in its lock out position.

4. In a transmission, the combination with a drive shaft and clutch control means, of means for establishing a one-way drive between said drive shaft and the vehicle to be operated, means for locking out said one-way drive means to establish a two-way drive between said shaft and vehicle, operating means for said lock out means, operator controlled means for temporarily connecting said lock out operating means and said clutch control means, means for locking said lock out operating means in its lock out position and means for automatically returning said lock out means to its non-lock out position upon the release of said lock out operating means.

5. In a transmission, the combination with a drive shaft, of an engine clutch pedal and a transmission control lever, means for establishing a one-way drive between said drive shaft and the vehicle to be driven, means for locking out said one-way drive means to establish a two-way drive between the shaft and the vehicle, operating means for said lock out means, means for temporarily connecting said lock out operating means with said clutch pedal, means for locking said lock out operating means in its lock out position and means associated with said control lever for operating said connecting means and for releasing said locking means.

6. In a transmission, the combination with a drive shaft, a clutch pedal and a shift lever, means for establishing a one-way drive between the drive shaft and the vehicle to be operated, means for locking out said one-way drive means to establish a two-way drive between said drive shaft and the vehicle, means for operating said lock out means, means for temporarily connecting said lock out operating means with the clutch pedal, means for locking said lock out operating means in its lock out position and means associated with the shift lever for operating said connecting means and releasing said locking means, said means associated with the shift lever indicating by its position the condition of the lock out means.

7. In a transmission, the combination with a drive shaft, a clutch pedal and a shift lever, of means for establishing a one-way drive between said drive shaft and the vehicle to be driven, means for locking out said one-way drive means to establish a two-way drive between said drive shaft and the vehicle, means for operating said lock out means, means for temporarily connecting said operating means to the clutch pedal, means for locking said operating means in its lock out position, control means associated with said shift lever for operating said connecting means and for releasing said locking means, said control means being biased in its releasing means and means for locking the control means in its connection operating position.

8. In a transmission, the combination with a drive shaft and a clutch pedal, of means for establishing a one-way drive between the drive shaft and the vehicle to be operated, means for locking out said one-way drive to establish a two-way drive between the drive shaft and the vehicle, operating means for said lock out means, means for connecting the lock out operating means to the clutch pedal during a portion of the movement of said clutch pedal in one direction while permitting a continued movement of the clutch pedal in the same direction and a movement of the clutch pedal in the opposite direction without affecting the lock out operating means, releasable locking means for holding the operating means in its lock out position and means for returning the lock out means to non-lock out position on release of said locking means.

9. In a transmission, the combination with a drive shaft and a clutch pedal, of means for establishing a one-way drive between the drive shaft and the vehicle to be operated, means for locking out said one-way drive means to establish a two-way drive between the drive shaft and the vehicle to be operated, means for biasing said lock out means to inoperative position, means for moving said lock out means to operative position, means for temporarily connecting said moving means with the clutch pedal, means for locking said moving means in its lock out position, control means for said connecting and locking means normally biased to a position to cause said locking means to release and means for locking said control means in a position to cause said connecting means to operate and said locking means to lock.

10. In a transmission, the combination with a drive shaft, a clutch control means, of means for establishing a one-way drive between said drive shaft and the vehicle to be operated, means for locking out said one-way drive means to establish a two-way drive between said shaft and the vehicle, operating means for said lock out means, and normally inoperative means for connecting said lock out operating means and clutch control means.

11. In a transmission, the combination with a drive shaft, a clutch control means, of means for establishing a one-way drive between said drive shaft and the vehicle to be operated, means for locking out said one-way drive means to establish a two-way drive between said shaft and the vehicle, operating means for said lock out means, and normally inoperative means for temporarily connecting said locking out operating means and said clutch control means.

12. In a transmission, the combination with a drive shaft, a clutch control means, of means for establishing a one-way drive between said drive shaft and the vehicle to be operated, means for locking out said one-way drive means to establish a two-way drive between said shaft and the vehicle, operating means for said lock out means, and normally inoperative means for connecting said lock out operating means and said clutch control means, said connecting means being released after the lock out means has been rendered effective.

13. In a transmission, the combination with a drive shaft, a clutch control means, of means for establishing a one-way drive between the drive shaft and the vehicle to be operated, means for locking out said one-way drive means to establish a two-way drive between said shaft and said vehicle, and means operated by the clutch control means for operating said lock out means, said lock out means being normally unaffected by the operation of the clutch control means when in nonoperative position.

14. In a transmission, the combination with a drive shaft, a clutch control means, of means for establishing a one-way drive between the drive shaft and the vehicle to be operated, means for locking out said one-way drive means to establish a two-way drive between said shaft and vehicle, means operated by the clutch control means for operating said lock out means, said lock out means being normally unaffected by the operation of the clutch control means when in nonoperative relation, and means within the control of the operator for effecting the operation of said lock out means by said clutch control means.

15. In a transmission, the combination with a drive shaft, a clutch control means, of means for establishing a one-way drive between the drive shaft and the vehicle to be operated, means for locking out said one-way drive means to establish a two-way drive between said shaft and said vehicle, and normally inoperative operator controlled means for effecting a connection between said lock out means and said clutch control means.

16. In a transmission, the combination with a drive shaft, a clutch control means, of means for establishing a one-way drive between the drive shaft and the vehicle to be operated, means for locking out said one-way drive means to establish a two-way drive between said shaft and said vehicle, normally inoperative operating means for said lock out means, and operator controlled means for effecting a connection between said lock out means and said clutch control means and locking said lock out means in lock out position.

17. In a transmission, the combination with a drive shaft, a clutch control means, of means for establishing a one-way drive between the drive shaft and the vehicle to be operated, means for locking out said one-way drive means to establish a two-way drive between said shaft and said vehicle, operating means for said lock out means normally unaffected by the operation of said clutch control means, and operator controlled means for connecting the clutch control means with the lock out means and for causing the movement of the lock out means to an inoperative position.

18. In a transmission, the combination with a drive shaft, a clutch control means, of means for establishing a one-way drive between the drive shaft and the vehicle to be operated, means for locking out said one-way drive means to establish a two-way drive between said shaft and said vehicle, means for operating said lock out means normally unaffected by the operation of the clutch control means, and an operator controlled member for effecting a connection between said lock out means and clutch control means and for causing a movement of the lock out means to inoperative position, said member indicating the condition of the lock out means.

19. In an automotive vehicle, the combination of a clutch, means movable to release the clutch, a member driven by the clutch, an overrunning drive between the clutch and the driven member, means for locking out the overrunning drive, means interconnecting the clutch-releasing means and the locking-out means, and means controllable at will for rendering the interconnecting means effective and ineffective.

JOHN M. SIMPSON.
HARRY J. HECK.